United States Patent [19]

Lee

[11] Patent Number: 5,714,748
[45] Date of Patent: Feb. 3, 1998

[54] MAGNETIC CARDS EMPLOYING OPTICAL RECORDING MATERIAL

[75] Inventor: Dong Cheol Lee, Seoul, Rep. of Korea

[73] Assignee: Goldstar Co., Ltd., Rep. of Korea

[21] Appl. No.: 741,031

[22] Filed: Oct. 30, 1996

Related U.S. Application Data

[63] Continuation-in-part of Ser. No. 551,443, Nov. 1, 1995, abandoned, which is a continuation of Ser. No. 130,334, Oct. 1, 1993, abandoned.

[30] Foreign Application Priority Data

Oct. 2, 1992 [KR] Rep. of Korea ............... 1992-18138

[51] Int. Cl.[6] ............... G06K 19/06; G06K 7/10
[52] U.S. Cl. ............... 235/494; 235/454; 235/380
[58] Field of Search ............... 235/454, 449, 235/494, 493, 379, 380, 381, 384, 440, 375, 487; 902/25, 27; 360/59; 369/100, 273

[56] References Cited

U.S. PATENT DOCUMENTS

| | | | |
|---|---|---|---|
| 3,935,933 | 2/1976 | Tanaka et al. | 235/493 X |
| 4,013,894 | 3/1977 | Foote et al. | 235/440 X |
| 4,360,728 | 11/1982 | Drexler | 902/27 X |
| 4,644,151 | 2/1987 | Juvinall | 235/494 X |
| 4,684,795 | 8/1987 | Colgate, Jr. | 235/487 X |
| 4,733,060 | 3/1988 | Dono et al. | 902/27 X |
| 4,795,695 | 1/1989 | Pan et al. | 430/495 |
| 4,812,386 | 3/1989 | Pan et al. | 430/290 |
| 4,860,274 | 8/1989 | Kobayashi | 369/180 |
| 4,901,241 | 2/1990 | Schneck | 235/380 X |
| 4,910,725 | 3/1990 | Drexler et al. | 235/454 X |
| 4,954,904 | 9/1990 | Goor | 360/75 |
| 5,311,138 | 5/1994 | Togawa | 235/454 X |
| 5,331,138 | 7/1994 | Saroya | 235/492 X |
| 5,332,890 | 7/1994 | Kitahara | 235/492 X |
| 5,471,044 | 11/1995 | Hotta et al. | 235/487 |

FOREIGN PATENT DOCUMENTS

| | | |
|---|---|---|
| 0254371 | 12/1985 | Japan. |
| 1-150246 | 6/1989 | Japan. |
| 1-220238 | 9/1989 | Japan. |
| 1-243252 | 9/1989 | Japan. |
| 2-139732 | 5/1990 | Japan. |
| 3-141028 | 6/1991 | Japan. |
| 3-141050 | 6/1991 | Japan. |
| 404005787A | 1/1992 | Japan. |
| 91-1334 | 3/1991 | Rep. of Korea. |
| 91-2062 | 4/1991 | Rep. of Korea. |

OTHER PUBLICATIONS

Japanese publication No. 91-1334, Mar. 1991.
Japanese publication No. 91-2062, Apr. 1991.

*Primary Examiner*—Donald T. Hajec
*Assistant Examiner*—Thien Minh Le
*Attorney, Agent, or Firm*—Bell, Boyd & Lloyd

[57] ABSTRACT

This invention relates to a magnetic card for use in public telephones or public traffic such as subway, which includes a blank card, a magnetic layer formed on the blank card for recording variable information indicating amount of available money left according to amount used of the card, and an optical recording layer formed on the magnetic layer for recording invariable information marking card price. It is possible to prevent the magnetic cards from deterioration of the record like erasure of record of money due to mishandling in everyday life and has the advantage of high response speed because of utilization of light.

12 Claims, 3 Drawing Sheets

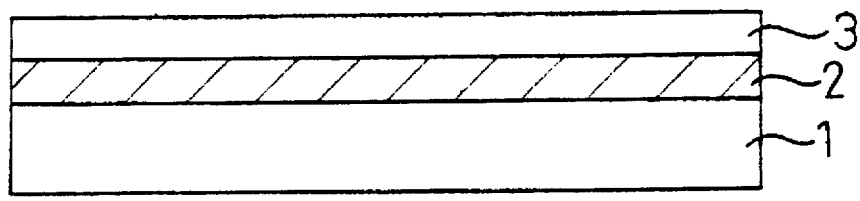
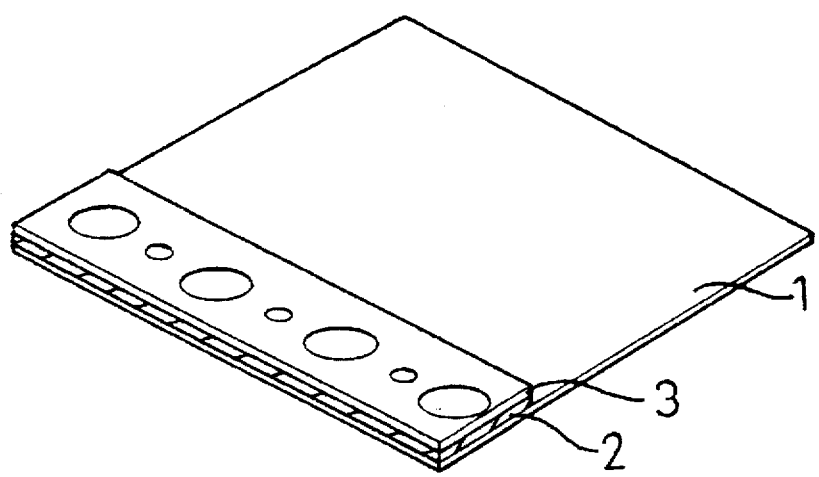
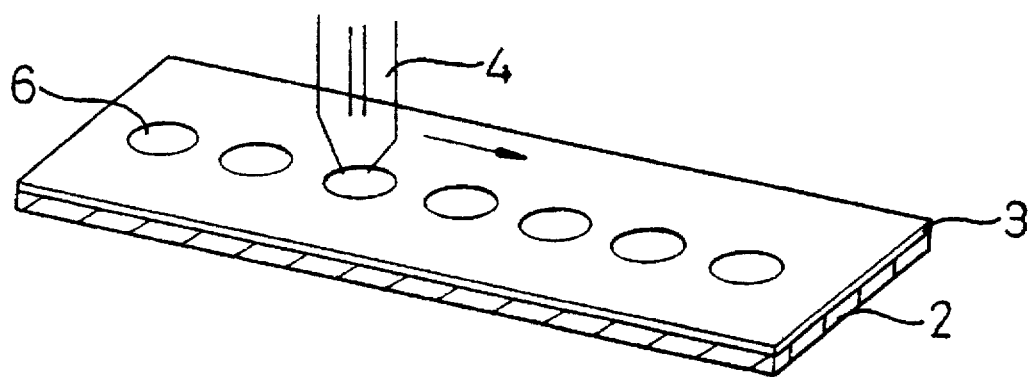

MAGNETIC CARDS EMPLOYING OPTICAL RECORDING MATERIAL

This application is a Continuation-In-Part, of application Ser. No. 08/551,443 filed Nov. 1, 1995 , now abandoned, which is a continuation of application Ser. No. 08/130,334, Filed Oct. 1, 1993 , now abandoned.

FIELD OF THE INVENTION

This invention relates to magnetic cards for use in public telephones or public traffic such as subway, more particularly to magnetic cards employing optical information recording material.

BACKGROUND OF THE INVENTION

There are two kinds of magnetic cards recording data magnetically thereon, one kind is cards designating a user by means of passwords etc., such as cash cards and the other kind is cards not designating any user such as cards for public traffic like subway. Improper use of the former cards can be prevented by passwords, but counterfeit of the latter cards is possible as the cards are not provided with passwords.

Currently, magnetic cards are produced employing following two methods to prevent forgery or counterfeit.

One is the water mark method of EMI in U.K., in which a counterfeit discernment signal having periodic changes in the direction of the magnetic layer is implanted permanently. The other one is the method of NTT in Japan, in which a magnetic layer having low coercive force with high magnetic permeability is coated on magnetic layer having high coercive force so that only a special head of a card reader can record or reproduce on these cards In order to prevent cards from being counterfeited.

But in case of the water mark method of U.K., the price of the equipment which will change the direction of the magnetic layer In a certain period Is very expensive, and the cards are expensive and have low productivity due to the defects coming from the difficult process of alignment of the direction of magnetic layer in cohesion of the magnetic stripe on film. Further, the information recorded on the cards is susceptible to erasure due to the low coercive force of the magnetic layer which has been selected for ease of periodic change of the direction of magnetic layer.

On the other hand, in case of the method of NTT of Japan, the material costs are high because the cards have to be coated with the magnetic layer all over the card surface. And It has been a problem of this method, in coating a magnetic layer having very low coercive force with high permeability on a magnetic layer having high coercive force, to put a proper thickness of the magnetic layer having low coercive force with high permeability, depending on which the current induced on the head varies. Further, it has been a problem in the currently employed two methods of magnetic counterfeit preventive means to counterfeit with ease by magnetically reproducing the record of used magnetic cards or magnetically changing the record of the cards from low price ones to high price ones.

SUMMARY OF THE INVENTION

The object of this invention is to provide a magnetic card having an optical recording layer capable of preventing forgery or counterfeit of the card.

Another object of this invention is to provide magnetic cards having different designs of the optical recording layer depending on card prices.

These and other objects and features of this invention can be achieved by providing a magnetic card comprising a blank card, a magnetic layer formed on the blank card for recording variable informations indicating amount of available money left according to amount used of the card, and an optical recording layer formed on the magnetic layer for recording invariable informations marking the card price.

BRIEF DESCRIPTION OF THE DRAWINGS

FIG. 1 shows construction of a magnetic card in accordance with this invention.

FIG. 2 is a perspective view of a magnetic card in accordance with this invention.

FIG. 3 shows operation of a reproduction head reproducing informations from an optical recording layer in accordance with this invention.

FIGS. 4(A), 4(B) and 4(C) show the methods to mark the card prices in accordance with the features of pits on the cards in accordance with this invention, wherein FIG. 4(A) shows the method to mark the card prices accordance with the number of same size pits, FIG. 4(B) shows the method to mark the card prices in accordance with the shape and the size of pits, and FIG. 4(C) shows the method to mark the card prices in accordance with the length of pits.

DETAILED DESCRIPTION OF THE INVENTION

FIG. 1 shows construction of a magnetic card in accordance with this invention, including a blank card 1, a magnetic layer 2 formed on the blank card 1 for recording variable informations depending on the amount used of the card, and an optical recording layer 3 formed on the magnetic layer 2 for recording features of pits 6 in accordance with the card price. Shown in FIG. 2 is a perspective view of the magnetic card shown in FIG. 1.

The optical recording layer 3 is made of optical recording material of Bi family at least one of Te, Se, Sb, Pb, Al, Ge, Ce added therein in the periodic table of the elements in an unrecorded state and capable of recording only one time. As used herein, "erase"means changing the state of the one-time recording material from a recorded state to a non-recorded state by forming a write-once thin film optical recording layers. Write-once means that the layers can be recorded upon only once at the recorded locations.

Figure 4A:
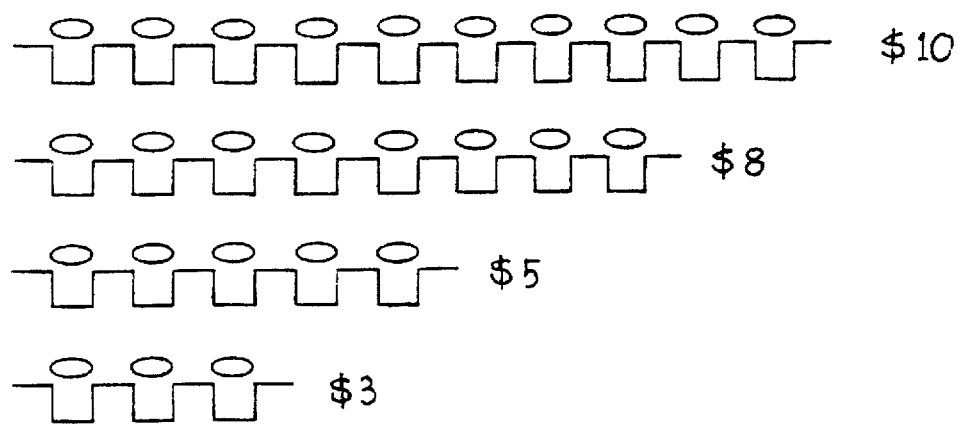
Figure 4B:
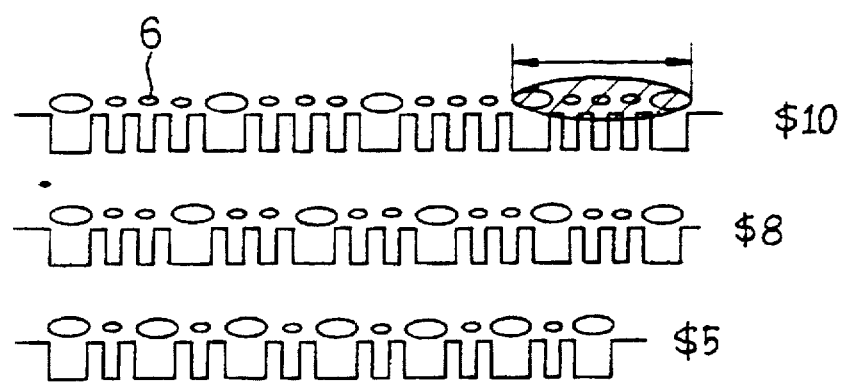
Figure 4C:
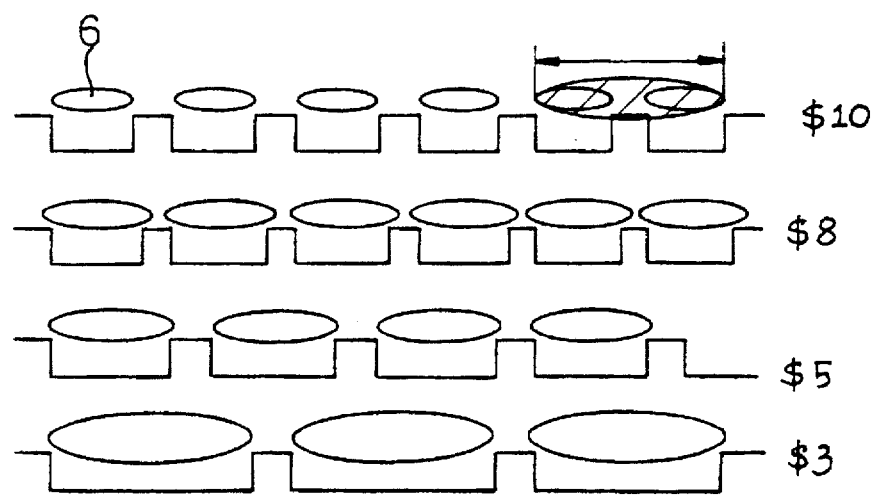

In this invention, the card prices are marked in a recorded state by means of the number and/or the features of the pits 6 formed in the optical recording layer 3 as shown in FIGS. 4(A), 4(B) and 4(C).

Figure 5:
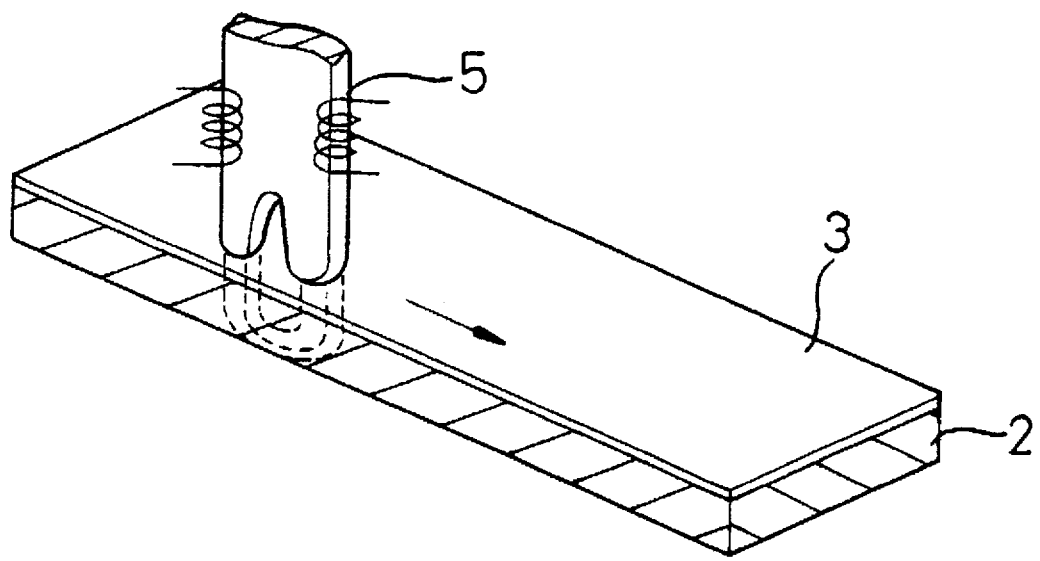
FIG. 5 shows operation of a magnetic head recording and reproducing the magnetic layer.

FIG. 4(A) shows the method to mark the card prices in accordance with the number of same size pits 6. As shown in FIG. 3, the optical recording layer 3 is irradiated by a laser beam from the reproduction head 4 in order for the reproduction head 4 to read in the recorded informations on the optical recording layer 3. In this time, the reproduction head 4 employing the laser beam identifies the number of pits 6 card price and erases as many pits 6 as needed to define the amount of the card. The amount of money available to use can be identified from the difference of reflection ratio of the laser beam reflected at the erased part and un-erased part of the optical recording layer 3. The variable data about the amount of available money is recorded on the magnetic layer 2 by the magnetic head 5 as shown in FIG. 5 to indicate it to an user.

FIG. 4(B) shows the method to mark the card prices in accordance with the shape and the size of pits 6. The reproduction head 4 employing laser beam identifies the card prices by reading the shape and size of the pits 6 and erases as many pits 6 as the amount used of the card. The amount of available money is recorded on the magnetic layer 2 by the magnetic head 5.

FIG. 4(C) shows the method to mark the card price in accordance with the length of pits 6. The reproduction head 4 employing laser beam identifies the card price by reading the length of the pits 6 and erases as many pits as the amount used of the card. The amount of available money is recorded on the magnetic layer 2 by the magnetic head 5.

A source of optical recording material is from the Bi family and that this material is capable of recording only once. Write-once optical recording components are well know in the art. Sputtering a member of the Bi family while cooling the substrate prevents the sputtered material from crystallizing as it is coated on the card in atomic or molecular form. The sputtered film is heated by a laser to form pits and thus record by crystallizing the coating. Once recrystallized, the film does not return to the amorphous state, and therefore cannot again be recorded on. However, in accordance with an aspect of the present invention the recorded pits are "erased"or rendered unreadable by linking adjacent pits together with a laser to crystallize the coating between the pits. The linking of adjacent pits to erase is shown in FIG. 4(B) and 4(C) by the shaded area under the double head leadline.

WRITE-ONCE SYSTEMS

As described in U.S. Pat. Nos. 4,795,695and 4,812,368 , thin amorphous film recording layers can be prepared by conventional thin film deposition techniques such as evaporation, RF (radio frequency) and DC (direct current) sputtering from an alloy target, and RF and DC co-sputtering from targets of the individual elements. Enhancement of sputtering processes by applying magnetic fields (magnetron sputtering) can also be used. The thickness of the film can be from a few tens to a few hundreds nanometers depending on the compromise among factors such as sensitivity, production rate, material cost, and ease of control. Supports upon which such films are deposited include plastic films, such as polyethylene terephthalate, polymethyl methacrylate, polycarbonate, glass plates, and paper or metal plates.

U.S. Pat. Nos. 4,795,695 and 4,812,368 provide write-once thin film SbSnGe alloy layers, and these two patents are incorporated herein by reference.

U.S. Pat. No. 5,247,494 discloses another write-once type recording system which has a thin layer formed on a surface of a substrate having a low melting point or a low sublimation point. The recording or writing process is to write by heat-deforming the thin layer by irradiating the surface using a light beam of a laser. Alternatively, the write-once type recording is a TeOx thin film layer which is a composition of Te and $TeO_2$. A TeOx-Au thin film layer made by adding Au to TeOx, a TeOx-Pd thin film layer made by adding Pd to TeOx, a $Sb_2Te_3$ thin film layer or and $Sb_2Se_3$ thin film layer. The writing process is to irradiate the thin film using a pulse light bean of a laser, followed by heating and cooling, thereby to change the refractivity and extinction coefficient of the irradiated part of the thin film, and to vary irreversibly the reflectance of the irradiated part. U.S. Pat. No. 5,247,494 is incorporated herein by reference.

As described in Television Engineering Handbook, K. B. Benson editor, rev. by Jerry C. Whitaker, McGraw-Hill, 1992, page 16.25, another well known write-once system uses the laser-beam ablation of metal films technique which involves imaging a laser beam on a transparent substrate which is coated with a low-melting-point metal. Popular metals are bismuth and tellurium and alloys of tellurium, arsenide, and selenium. Tellurium-coated substrates have been widely experimented with because of their high sensitivity and resolution capability. However, the toxicity and affinity to oxidation of tellurium have led to alloying it with arsenide and selenium and to hermetically sealing the alloy-coated surface in a disc sandwich configuration. Metal coating thicknesses vary from 10 to 50 nm. Since the actual ablation process involves both melting and evaporation of the metal, the selection of the optimum metal must also include consideration of its surface tension, heat of fusion, and toxicity.

The ablative system also contemplates a recording layer of, for example, Bi, a TeSe alloy or a dye is used in which holes or cavities are formed upon exposure to light. The holes or cavities are read by means of weak laser light on the basis of differences in reflection between a hole or cavity and the surroundings thereof. U.S. Pat. No. 4,230,939 discloses a suitable combination metal (Examples: Bi, Te, Ind, Sn, Cu, Al, Pt, Au, Rh, As, Sb, Ge, Se, Ge) and dye system wherein a laser forms recording holes through the metal and dye layers. U.S. Pat. No. 4,230,939 is incorporated herein by reference.

U.S. Pat. No. 4,647,944 is directed to a method for the optical recording of information in which a recording element comprises a substrate and a recording layer. The recording layer is exposed to laser light which is modulated in accordance with the information to be recorded, in which an optically readable change in structure occurs in the recording layer in the exposed places which is read by means of laser light via the substrate on the basis of differences in reflection with the surroundings. This method is characterized in that an amorphous recording layer of $In_xSb_{1-x}, Ga_{1-x}$ or $(InSb)_ySe_{1-y}$ which is provided on a synthetic resin substrate in a maximum thickness of 150 nm, is exposed to infrared laser light having a wavelength of 750–900nm which is pulsated in accordance with the binary (digital) information to be recorded with a pulse time of at most 200ns, crystalline area (bits) with maximum dimensions of a few micrometers being formed in a amorphous layer in the exposed places. The amorphous recording layer is provided on the synthetic resin substrate by means of a sputtering process or a vapor deposition process. The sputtered or vapor-deposited layer is amorphous. The synthetic resin substrate is, for example, a synthetic resin substrate or polymethyl methacrylate or polycarbonate. The substrate may alternatively be manufactured, for example, from glass and be coated with a synthetic resin layer on which the recording layer is then provided. Both the amorphous parts of the recording layer and the crystalline bits formed therein are very stable. This means that the optical recording element has a life of at least 10 years. The method described is a so-called write once optical recording. Although in principle a reversible process is possible in which the crystalline bits are converted again into amorphous material and the recorded information is erased, the method according to this patent provides such stable crystalline bits that conversion back to back to the amorphous starting material is not considered to be practical. U.S. Pat. No. 4,647,944 is incorporated herein by reference.

In accordance with the present invention, the recorded pits in each of the alternative write-once systems are erased by using a laser beam to record between the pits in the same manner as the pits were recorded. For example, in the ablation process the laser melts and/or evaporates the metal between the pits so that there is no difference in reflectance between the pits and the space therebetween to measure the pits and thereby effectively erase them.

Because the material of the optical recording layer 3 for recording invariable informations is of material which can be recorded only once, it is absolutely impossible to forge or counterfeit by means of erasure and re=recording on the optical recording layer 3, and the fact that the invariable informations can not be read with naked eyes discourages people to forge or counterfeit. Also, when the information read by the reproduction head 4 and the information read by the magnetic head 5 are not consistent, it judges that the card has been forged or counterfeited.

As described hereinbefore, in accordance with this invention, it is possible to prevent the magnetic cards from forgery or counterfeit by employing optical material which can be used only once, whereby the reliability of magnetic cards is improved. It is also possible to prevent the magnetic cards from deterioration of the record like erasure of record of money due to mis-handling in everyday life and has the advantage of high response speed because of utilization of light.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

Although the invention has been described in conjunction with specific embodiments, it is evident that many alternatives and variations will be apparent to those skilled in the art in light of the foregoing description.. Accordingly, the invention is intended to embrace all of the alternatives and variations that fall within the spirit and scope of the appended claims.

What is claimed is:

1. A magnetic card for preventing a forgery or counterfeit, comprising:
    a blank substrate,
    a magnetic layer formed on said blank card for recording variable informations indicating amount of available money left according to amount used of the card; and
    an optical recording layer formed on said magnetic layer for recording a plurality of pits marking card price which are erased according to the amount used of the card, said optical recording layer being formed of one-time recordable material which once recorded thereon can only be erased by linking the erased pits together with a laser beam to irradiate the space between erased pits.

2. A magnetic card as claimed in claim 1, wherein material of said optical recording layer is made of Bi family including at least one of Te, Se, Sb, Pb, Al, Ge and Ce added therein, and is used only once.

3. A magnetic card as claimed in claim 1, wherein the plurality of pits are composed of same size pits and number of the plurality of pits on the card are different according to the card price.

4. A magnetic card as claimed in claim 1, wherein the plurality of pits are composed of pits having different size and shapes according to the card price.

5. A magnetic card as claimed in claim 1, wherein the plurality of pits are composed of pits having different sizes according to the card price.

6. A method of using the magnetic card of claim 1, comprising the steps of:

(a) if an initial price of the card is less than an initial value of the card as represented by the pits, irradiating said optical recording layer with a laser beam to erase a pit or pits by linking the erased pits together with the laser beam to irradiate the space between erased pits such that the remaining pits represent said initial price;

(b) recording said initial price on said magnetic layer;

(c) during use of the card after steps (a) and (b) irradiating said optical recording layer with a laser beam to erase a pit or pits corresponding to the cost of the use such that the remaining pits represent the remaining value, if any, of the card, the pit(s) being erased by linking the pits together with the laser beam; and (d) recording the remaining value of the card on said magnetic layer;

whereby the card is useable only if the remaining value as recorded on said magnetic recording layer and on said optical recording layer are the same.

7. The method of claim 6 wherein the initial value and the remaining value of the card are determined by the difference between the reflectance ratio of a laser beam at an erased part and at an unerased part of said optical recording layer.

8. The method of claim 6 wherein the remaining value of the card as recorded on the said magnetic recording layer is read by a magnetic head.

9. A method of using a magnetic card for preventing a forgery or counterfeit wherein said magnetic card includes a blank card, a magnetic recording layer formed on said blank card for recording variable information indicating amount of available money left according to amount used of the magnetic card, and an optical recording layer formed on said magnetic layer for recording a plurality of pits marking card price which are erased according to the amount used of the magnetic card, said optical recording layer being formed of one-time recordable material which once recorded thereon can only be erased, said method comprising the steps of:

during each use of the magnetic card, irradiating said optical recording layer with a laser beam to erase a pit or pits corresponding to the cost of the use such that the remaining pits represent the remaining value, if any, of the magnetic card, the pit(s) being erased by linking the pits together with the laser beam to irradiate the space between erased pits;

recording the remaining value of the card on said magnetic layer; and also during each use of the magnetic card, reading the remaining value as recorded on said magnetic recording layer and on said optical recording layer and judging the magnetic card forged or counterfeit when the remaining values are not the same.

10. The method of claim 9 wherein the initial value and the remaining value of the card are determined by the difference between the reflectance ratio of a laser beam at an erased part and at an unerased part of said optical recording layer.

11. The method of claim 10 wherein the remaining value of the card as recorded on the said magnetic recording layer is read by a magnetic head.

12. A magnetic card for preventing a forgery or counterfeit comprising:
    a substrate,
    means including a magnetic recording layer formed on said blank card for recording variable information indicating amount of available money left according to amount used of the card; and
    means including an optical recording layer formed on said magnetic layer for recording a plurality of pits marking card price; said optical recording layer being formed one-time recordable material which once recorded thereon can only be erased by linking the erased pits together with a laser bean to eradicate the space between erased pits, and said pits being erasable according to the amount used of the card.

* * * * *